United States Patent [19]

Itou et al.

[11] Patent Number: 4,693,222
[45] Date of Patent: Sep. 15, 1987

[54] INTAKE AIR CONTROL DEVICE FOR AN INTERNAL COMBUSTION ENGINE

[75] Inventors: Hiroshi Itou, Nagoya; Yukihiro Okane, Toyota; Akio Kuramoto, Okazaki, all of Japan

[73] Assignee: Toyota Jidosha Kabushiki Kaisha, Aichi, Japan

[21] Appl. No.: 938,463

[22] Filed: Dec. 5, 1986

[30] Foreign Application Priority Data

Dec. 18, 1985 [JP] Japan .................................. 60-282741

[51] Int. Cl.⁴ ........................................ F02B 15/00
[52] U.S. Cl. ...................... 123/432; 123/497; 123/177 G; 123/559
[58] Field of Search ............... 123/432, 179 G, 497, 123/339, 585

[56] References Cited

U.S. PATENT DOCUMENTS 4,524,739  6/1985  Kashiwaya et al. ............... 123/585

FOREIGN PATENT DOCUMENTS 59-18227  1/1984  Japan .
59-28044  2/1984  Japan .

Primary Examiner—E. Rollins Cross
Attorney, Agent, or Firm—Parkhurst & Oliff

[57] ABSTRACT

An intake air control device for an internal combustion engine having a battery, an electrically operated fuel pump, a fuel injector, an intake air flow control means operative in response to the running condition of the engine, and an operating means for operating the air flow control means. The device further comprises a detecting means for detecting the voltage of the battery, and a control means for controlling the operating means for the intake air flow control means such that the amount of the intake air is decreased when the detected voltage is lower than a predetermined value.

6 Claims, 6 Drawing Figures

INTAKE AIR CONTROL DEVICE FOR AN INTERNAL COMBUSTION ENGINE

BACKGROUND OF THE INVENTION

1. Field of the Invention

The present invention relates to an intake air control device for an internal combustion engine.

2. Description of the Related Art

The amount of the intake air is normally controlled by a throttle valve mechanically connected to an accelerator pedal. It is known to provide a intake air control means operable in response to the running condition of the engine, other than such a manually operated throttle valve. For example, a supercharger is provided, which is connected to an output shaft of the engine via a solenoid clutch, which is activated to operate the supercharger when the load of the engine is high (c.f., for example, Japanese Unexamined Patent Publication Nos. 59-18227 and 59-28004). Alternatively, a second valve may be provided on the downstream side of the throttle valve, which is opened to improve the volumetric efficiency of the air sucked into the engine when the load or the speed of the engine is high.

It is necessary, in a fuel injection type of internal combustion engine, to inject the fuel at a constant pressure relative to the pressure in the intake air pipe, and thus an electrically operated fuel pump is used in such an engine.

The electrically operated fuel pump is designed so that it discharges a substantially constant output flow and receives a constant voltage from the battery. Nevertheless, there is a problem in that, as can be seen from FIG. 6 of the attached drawings, the output flow from the pump may drop if the voltage of the battery drops. A drop in the voltage of the battery may occur, for example, when lights and several electric auxiliary machines are used at the same time. Conventionally, taking this voltage drop into account, a fuel pump having an unnecessarily large capacity, capable of obtaining a sufficient output flow even under the reduced voltage, has been used. Further, the fuel consumption is remarkably increased when the load and speed of the engine is high, thus the capacity of the fuel pump must be further enlarged to ensure that the fuel delivery from the fuel pump may not become too low if the voltage drop occurs under this situation. Therefore, it is necessary to fit a relatively large, and thus expensive, fuel pump in an internal combustion engine.

SUMMARY OF THE INVENTION

It is an object of the present invention to solve the above problems. According to the present invention, there is provided an intake air control device for an internal combustion engine having a battery, an electrically operated fuel pump connected to said battery, fuel injector means supplied with fuel from said fuel pump, an intake air passage communicating with the engine cylinder, an intake air flow control means arranged in said intake air passage and operative in response to the running condition of the engine, an operating means for operating said air flow control means, a detecting means for detecting the voltage of said battery, and a control means for controlling said operating means so as to operate said intake air flow control means in such a manner that the amount of intake air is decreased when the detected voltage is lower than a predetermined value.

BRIEF DESCRIPTION OF THE DRAWINGS

The other objects and features of the present invention will become apparent from the following description of the preferred embodiments of the present invention, with reference to the drawings, in which.

DESCRIPTION OF THE PREFERRED EMBODIMENTS

Figure 1:
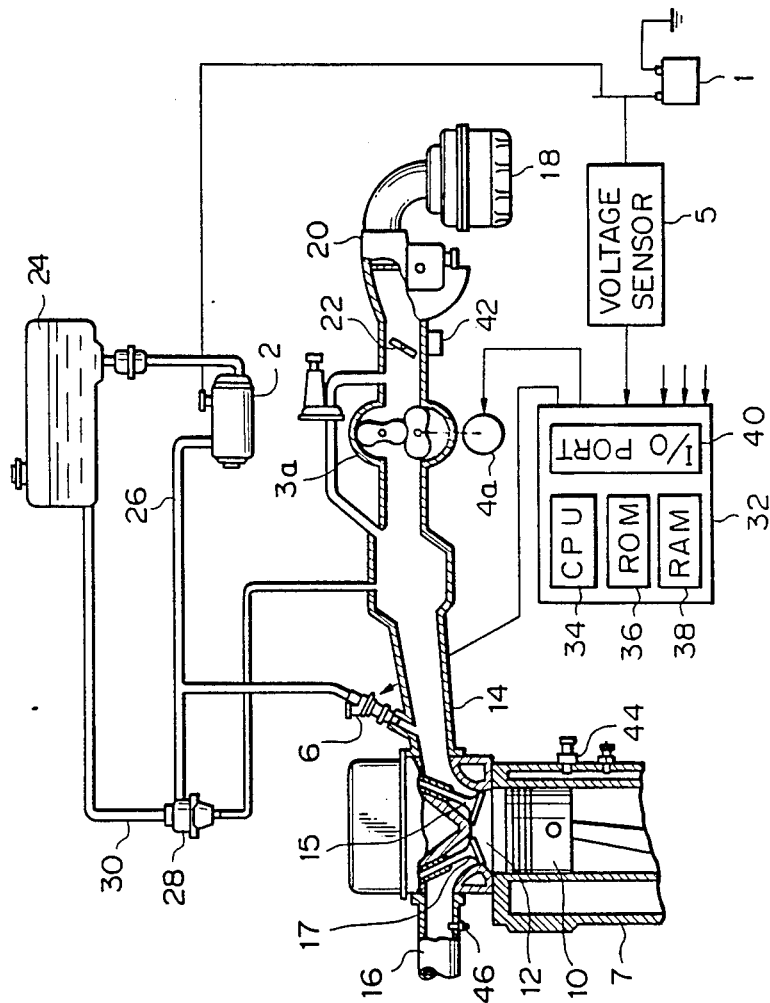
FIG. 1 is a view illustrating a preferred embodiment of the present invention.

Referring to FIG. 1, a body of an internal combustion engine 7 has a piston 10 inserted therein, with a combustion chamber 12 defined above the piston 10. An intake air passage 14 and an exhaust passage 16 are communicated with the combustion chamber 12, respectively, and an intake valve 15 and an exhaust valve 17 are provided, respectively. In the intake air passage 14, an air cleaner 18, an air flow meter 20, a throttle valve 22, a mechanically driven supercharger 3a, and a fuel injector 6 are arranged, in that order. In this embodiment, the mechanically driven supercharger 3a acts as an intake air flow control means, and is connected to an output shaft of the engine via a solenoid clutch 4a which acts as an operating means.

A fuel pump 2 is connected to a battery 1, which can also supply the voltage for other auxiliary machines and lights (not shown). The fuel pump 2 sucks fuel in a fuel tank 24 and delivers the fuel to a delivery pipe 26 which is connected to each fuel injector 6 in each cylinder. The delivery pipe 26 is further connected to the fuel tank 24 via a pressure regulator 28 and a return pipe 30. The pressure regulator 28 maintains the pressure of the fuel in the delivery pipe 26 substantially at a constant value relative to the pressure in the intake air passage 14, so that the opening time period of the fuel injector 6 is in proportion to the amount of fuel to be injected. It will be understood that the discharge flow of the fuel pump 2 must be large enough to exceed the amount of the fuel to be spent to maintain the pressure of the fuel at a substantially constant value relative to the pressure in the intake air passage 14.

The fuel injector 6 and the solenoid clutch 4a are controlled by an electric control unit 32. The electric control unit 32 can be constituted by a microcomputer comprising a central processing unit (CPU) 34 having arithmetic and control functions, a read only memory (ROM) 36 storing programs, and a random access memory (RAM) 38 storing data, these elements being interconnected by a bus, simultaneously with an input and output (I/O) port 40 for receiving detector signals and for delivering control signals. The detector signals can be obtained from, for example, the air flow meter 20, a throttle position sensor 42, an engine coolant temperature sensor 44, an oxygen sensor 46, and a revolutional speed sensor (not shown). According to the present invention, a voltage sensor 5 for detecting the voltage of the battery 1 is provided. It will be understood by a person having an ordinary skill in the art that the voltage of the battery 1 can be detected in the electric control unit 32.

Figure 2:
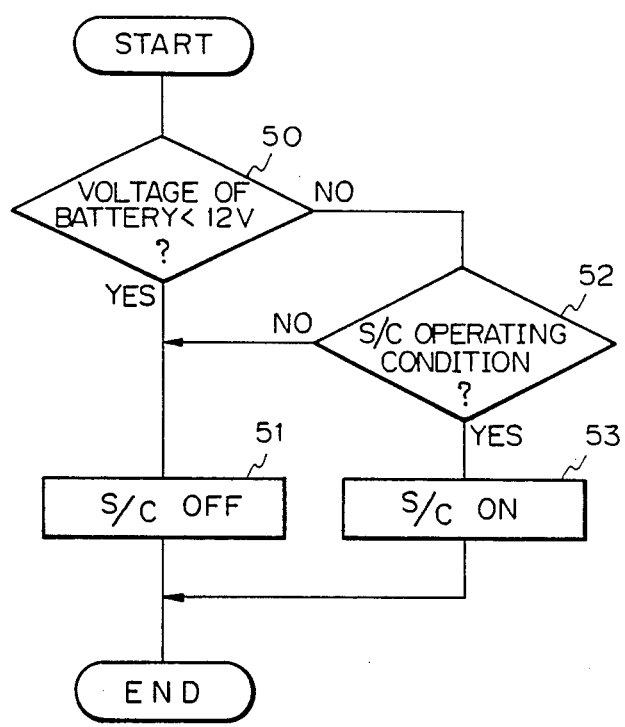
FIG. 2 is a flow chart illustrating the operation of the supercharger in FIG. 1.

The fuel injector 6 can be controlled in a known manner to obtain an optimum fuel injection amount based on the detection of the air flow meter 20 and corrected by other running conditions, such as the warming up of the engine. FIG. 2 illustrates a flow chart for controlling the solenoid clutch 4a to operate the supercharger 3a, starting at predetermined intervals. At step 50, it is determined if the detected voltage of the battery 1 is lower than a predetermined value (for example, 12 V). If YES at step 50, the program goes to step 51 to stop the operation of the supercharger (S/C) 3a. This is effected by disengaging the solenoid clutch 4a, whereby the supercharger 3a is disconnected from the drive by the output shaft of the engine and rotates freely by inertia. In this state, the supercharger does not effect any substantial supercharging action so that the amount of intake air is reduced to the same level as when a supercharger is not fitted. Since the amount of fuel is calculated on the basis of the intake air, the reduction of intake air leads to a reduction of the amount of fuel to be injected, and thus the output flow of the fuel pump 2, which may be decreased due to the voltage drop of the battery 1, can be maintained at a level exceeding the amount of fuel consumed. This description is based on the assumption that the fuel pump 2 does not have an excessive capacity and that the electric load is concentrated at that time.

If the judgement is NO at step 50, the program goes to step 52 to determined if the load and rotational speed of the engine is under a supercharger (S/C) operating condition. The design is such that the supercharger 3a is typically operated when the rotational speed of the engine is higher than a predetermined value or when the load of the engine, detected by the opening degree of the throttle or the amount of the intake air, is higher than a predetermined value. If YES at step 52, then the program goes to step 53 to cause the solenoid clutch 4a to be engaged and thus operate the supercharger 3a. If NO at step 52, the program goes to step 51 to stop the supercharger (S/C) 3a operation.

Figure 3:
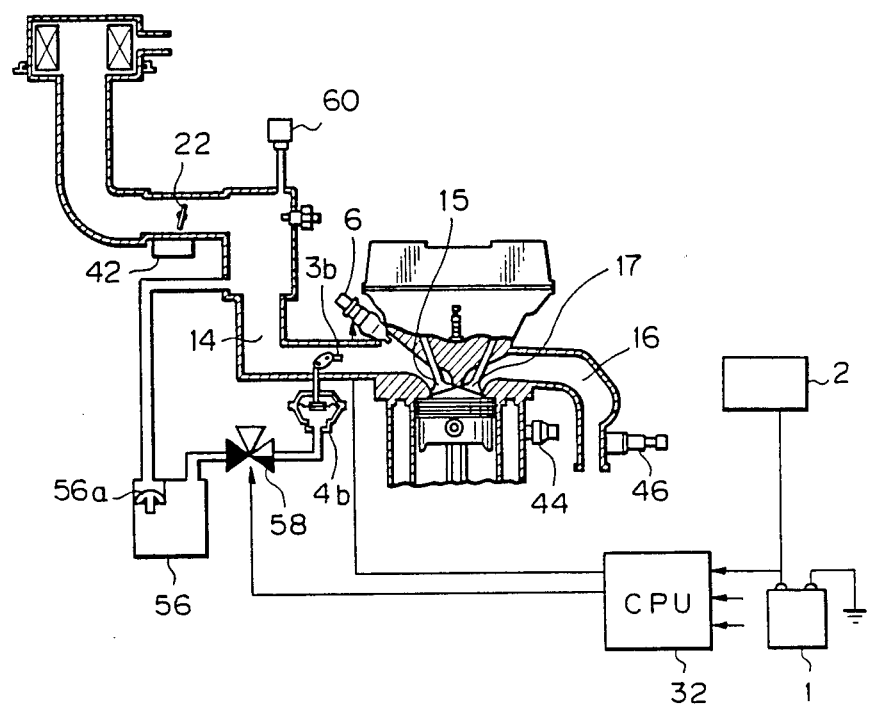
FIG. 3 is a view illustrating a second preferred embodiment of the present invention.
Figure 4:
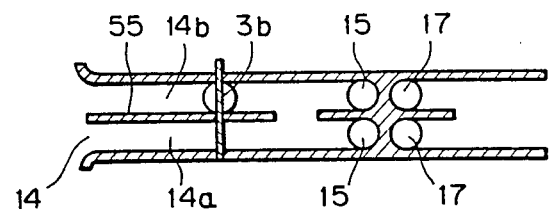
FIG. 4 is a view illustrating the intake air passage of FIG. 3 in section, passing through the second throttle valve in FIG. 3.

FIG. 3 shows a second embodiment of the present invention, in which a second throttle valve 3b is provided as the intake air flow control means. As shown in FIG. 4, the intake air passage 14 has a separating wall 55 extending longitudinally along a portion thereof between the first throttle valve 22 and the intake valve 15 (two intake valves 15 are provided for one cylinder in the example shown in FIG. 4). The separating wall 55 separates the intake air passage 14 into two parallel passages 14a and 14b and the second throttle valve 3b is arranged in one of the parallel passages 14a and 14b. The parallel passages are merged into one intake air passage 14 at upstream and downstream ends of the separating wall 55. A vacuum-operated actuator 4b is provided as the operating means for operating the second throttle valve 3b. The operating vacuum is fed from the intake air passage 14 on the downstream side of the first throttle valve 22 through a vacuum tank 56 and a solenoid valve 58. The vacuum tank 56 has a check valve 56a, for accumulating a high intake vacuum therein, and the solenoid valve 58 can feed either the vacuum accumulated in the vacuum tank 56 or the atmospheric pressure to the vacuum-operated actuator 4b. When the vacuum is introduced into the vacuum-operated actuator 4b, the diaphragm of the vacuum-operated actuator 4b is deformed to close the second throttle valve 3b. The solenoid valve 58 is controlled by the electric control unit 32 including the central processing unit (CPU) and a detecting means therein for detecting the voltage of the battery 1. It is also possible to provide a voltage detecting means on the outside of the electric control unit 32, as in the example of FIG. 1. Further, in this embodiment, a pressure sensor 60 is provided as the intake air flow detecting means in place of the air flow meter.

Figure 5:
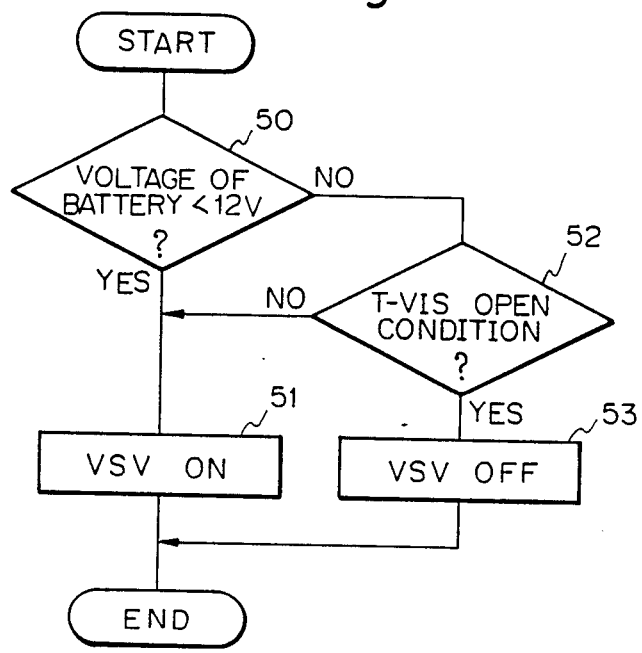
FIG. 5 is a flow chart illustrating the operation of the second throttle valve in FIG. 3.
Figure 6:
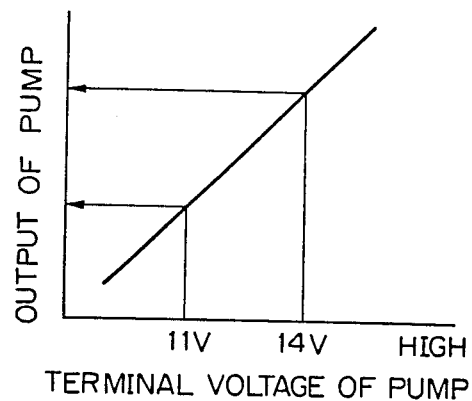
FIG. 6 is a graph showing the relationship between the voltage and the output flow of the fuel pump.

FIG. 5 is a flow chart for controlling the second throttle valve 3b, constituted by a fundamentally similar flow to that shown in FIG. 2, and thus the steps similar to those of FIG. 2 are represented by identical reference numerals. T-VIS at step 52 represents the second throttle valve 3b, and the T-VIS open condition is set such that the second throttle valve 3b opens when the revolutional speed and the load of the engine are higher than respective predetermined values. VSV represents the solenoid valve 58, and the vacuum is introduced into the vacuum-operated actuator 4b by switching on the VSV to close the second throttle valve 3b. When the second throttle valve 3b is closed, it is possible to generate an inertia supercharging effect and a swirl effect to improve the combustion efficiency, while the amount of the intake air is decreased by the increased flow resistance caused by the blockage of the parallel passages. By switching off the VSV, atmospheric pressure is introduced into the vacuum-operated actuator 4b and the second throttle valve 3b is opened. When the second throttle valve 3b is open, both the two parallel passages are opened so that the flow resistance is reduced and a large amount of intake air can be easily sucked into the engine.

As described above, it is possible, according to the present invention, to reduce the cost of the fuel pump since it is not necessary to use a fuel pump having a large capacity, which might be otherwise necessary when considering a rare condition occurrence. According to the present invention, the engine can normally run within the capacity of the fuel pump because of the effect of the intake air flow control means, even if the voltage drop rarely occurs.

We claim:

1. An intake air control device for an internal combustion engine having a battery, an electrically operated fuel pump connected to said battery, fuel injector means supplied with fuel from said fuel pump, an intake air passage communicating with the engine cylinder, an intake air flow control means arranged in said intake air passage and operative in response to the running condition of the engine, an operating means for operating said air flow control means, a detecting means for detecting the voltage of said battery, and a control means for controlling said operating means so as to operate said intake air flow control means such that the amount of the intake air is decreased when the detected voltage is lower than a predetermined value.

2. An intake air control device according to claim 1, wherein said intake air flow control means is a supercharger mechanically driven by said engine, and said operating means is a solenoid clutch for selectivity transmitting the engine power to said supercharger.

3. An intake air control device according to claim 2, wherein said engine comprises a throttle valve which is arranged on the upstream side of said supercharger.

4. An intake air control device according to claim 1, wherein said engine comprises an intake valve operable in synchronism with the engine and a throttle valve, and wherein said intake air flow control means is a valve means arranged between said intake valve and said throttle valve.

5. An intake air control device according to claim 4, wherein said intake air passage includes a separating wall which extends longitudinally along a portion thereof and separates the intake air passage into two parallel passages, and said valve means is arranged in one of the separated parallel passages.

6. An intake air control device according to claim 5, wherein said operating means comprises a vacuum-operated actuator.

* * * * *